Patented Sept. 25, 1928.

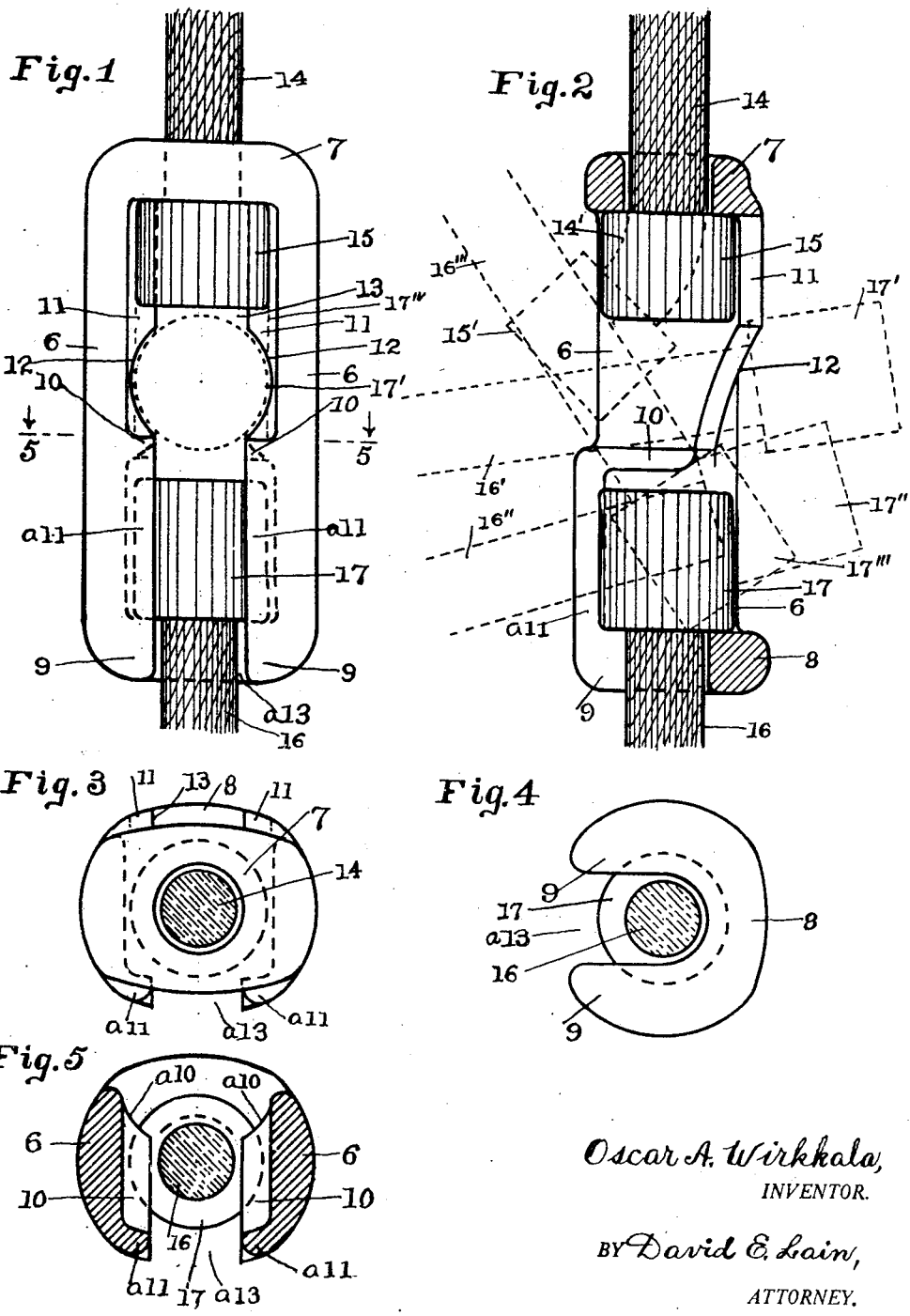

1,685,473

UNITED STATES PATENT OFFICE.

OSCAR A. WIRKKALA, OF DEMING, WASHINGTON.

BULL HOOK.

Application filed February 6, 1926. Serial No. 86,484.

My invention relates to improvements in bull hooks more especially those used with knobbed cables in logging, and one of the objects of my improvement is to provide a bull hook in which the choker cable engaged therewith has a wide latitude for swinging in the hook when not under strain, another object of my improvement is to provide a bull hook in which the cable knob is guided back to its strain position after having been displaced by strain release when in operation, and another object of my improvement is to provide a bull hook with which a pitch line may be connected while its knob is in place thereon.

I attain these objects with the mechanism illustrated in the accompanying sheet of drawings, which form a part of this specification, and in which Figure 1 is a front elevation of my bull hook connected to a pitch line and engaged with a choker cable. Fig. 2 is a side elevation of Fig. 1 in section on a medial vertical plane, Fig. 3 is a top plan view of Fig. 1, Fig. 4 is a bottom plan view of Fig. 2 and Fig. 5 is a plan view of Fig. 1 in section on a horizontal plane through line 5—5.

Similar characters refer to similar parts throughout.

More particularly: Swivel eye 7 at the upper end of the hook structure and U-form jaws 8, 9, 9 at the lower end thereof are joined by shank pillars 6, 6 integral therewith. Between said eye and jaws and opposite each other on the interior walls of pillars 6, 6 are transverse bosses 10, 10. The front end of these bosses may intersect front wall $a^{11}$ while their rear ends preferably do not extend to the rear sides of the pillars and are terminated with a concave curvature at $a^{10}$ Fig. 5. On the rear side of the structure between eye 7 and bosses 10 is wall 11 having hole 12 therethrough and vertical medial slot 13 intersecting said hole at the upper side thereof. That part of wall 11 penetrated by hole 12 is inclined downward and forward as shown in Fig. 2 and the part of slot $a^{13}$ between bosses 10 intersects hole 12. On the front of the hook structure between bosses 10 and jaws 9 is front wall $a^{11}$ divided by medial vertical slot $a^{13}$. Slots 13 and $a^{13}$ are the same width as the distance between jaws 9 and 9, and hole 12 is of greater diameter than the width of said slots. In eye 7 is placed pitch line 14 having knob 15 fastened to its lower end normally seated beneath said eye. Between jaws 9 is one end of choker cable 16 with knob 17 fastened thereto normally bearing on the top of said jaws. Cables 14 and 16 are narrower than slots 13 and $a^{13}$ and knobs 15 and 17 are of smaller diameter than hole 12, but long enough to not pass through said hole when presented sidewise thereto as shown in dotted lines at $17^{iv}$ in Fig. 1. Knob 17 is longer than knob 15, as illustrated, to show that my new bull hook is designed for use with both longer and shorter cable knobs which I find it convenient to use on the choker lines. In Fig. 2 a position assumed by cable 14 is shown in dotted lines at 14' as the same is being connected to the hook eye with knob 15 fastened in place. The knob and cable end are passed through the upper front of the hook between pillars 6, 6 which are at this place wide enough apart for this purpose.

To engage cable 16 with the hook it is placed approximately in the position shown at 16' but with the knob in front of hole 12. Then it is moved endwise rearward till the knob occupies the position shown in dotted lines at 17' when the cable is swung downward and drawn forward passing through the dotted-line position at 16'', 17'' from which place a continued downward swing of cable 16 will cause it to assume the operative position shown in full lines at 16 with knob 17 in place on and within jaws 8, 9, 9. To disengage cable 16 from the hook the reverse of the movements last recited is followed.

In sky-line logging it is usual to transport several large logs in one "turn". For this purpose each log is retained in a choker line the knob on the free end of which is engaged with a bull hook as knob 17 illustrated. The knob on the free end of the pitch line is engaged with the rigging plate while the knob on the other end of said pitch line is connected to the upper end of the bull hook as 15 illustrated. The rigging plate and outer end of the pitch line are not shown. In unloading the "turn" each log is released from its choker line separately. It often happens that the release of the last log of the "turn" suddenly permits relief of strain on the sky line the reaction of which tosses the heavy choker rigging high in the air. At such times a choker line may swing forcedly upward and forward around knob 17 as a pivot, when knob 17 will occupy its dotted-line position at 17''' bearing against bosses 10 and also often against the edges of the front wall $a^{11}$ when in its most upward position as indicated in dotted lines at 16''', 17'''. Also, during transportation of the "turn" on the sky line the strain on the sky line is often released temporarily resulting in poking cable 16 with knob 17 through the back of the hook in the general direction of the dotted-line position at 16″ but farther rearward. Then the load strain may be suddenly placed again on the sky line causing cable 16 to be quickly withdrawn through slot $a^{13}$ and knob 17 returned to its place on jaws 8, 9, 9; and then there must be a place for said knob 17 to freely pass through to its operative position on said jaws, otherwise, if it catches on an obstruction, say on wall 11 or on bosses 10, the pillars of the bull hook are likely to be pressed apart by the force of the thrust and the hook thus destroyed. In practice I have found that a construction substantially as illustrated suits the purpose very well and allows of the quick and forceful return of knob 17 from an outlying position at the rear of the hook to its operative position on jaws 9 without injury to the hook of any kind. In this connection the oblique inclination of the walls of hole 12 and the shortened and concaved rear ends of bosses 10 are useful.

Having thus disclosed my invention, what I claim as new and desire to secure by Letters Patent is,—

In a logging bull hook in combination, a hook eye to fasten a knotted pitch line thereto, U-form hook jaws, two pillars connecting said eye to said jaws integral therewith, two opposite transverse bosses on the interior walls of said pillars shorter than the width thereof, a front wall on said pillars extending from said jaws to said bosses having a central slot from said jaws to said bosses, and a rear wall on said pillars above the back of said U-form jaws disposed diagonally from said eye to the rear ends of said bosses having a transverse hole therethrough impassable for said knobbed pitch line when engaged in said eye but passable for a knobbed choker cable when presented endwise thereto and a slot from said eye to said bosses.

OSCAR A. WIRKKALA.